United States Patent
Fitzgerald et al.

(10) Patent No.: US 8,613,143 B2
(45) Date of Patent: Dec. 24, 2013

(54) BEVELOID PLANETARY GEAR DRIVE FOR TRANSFER CASE OR TRANSMISSION

(75) Inventors: Brian Fitzgerald, Cazenovia, NY (US);
Burke Smith, Syracuse, NY (US);
David W. Wenthen, Rochester Hills, MI (US)

(73) Assignee: Magna Powertrain of America, Inc., Troy, MI (US)

(*) Notice: Subject to any disclaimer, the term of this patent is extended or adjusted under 35 U.S.C. 154(b) by 0 days.

(21) Appl. No.: 13/509,320

(22) PCT Filed: Nov. 10, 2011

(86) PCT No.: PCT/US2011/060146
§ 371 (c)(1),
(2), (4) Date: May 11, 2012

(87) PCT Pub. No.: WO2012/091808
PCT Pub. Date: Jul. 5, 2012

(65) Prior Publication Data
US 2013/0263452 A1    Oct. 10, 2013

Related U.S. Application Data

(60) Provisional application No. 61/427,824, filed on Dec. 29, 2010.

(51) Int. Cl.
*B21K 1/30* (2006.01)
*B21D 53/28* (2006.01)

(52) U.S. Cl.
USPC ............ 29/893.34; 29/893.36; 29/893.3; 29/893.1; 29/893; 475/331; 419/38

(58) Field of Classification Search
USPC ............ 29/893–893.37, 90.6; 475/331
See application file for complete search history.

(56) References Cited

U.S. PATENT DOCUMENTS

| | | | |
|---|---|---|---|
| 3,605,518 A | 9/1971 | Haller | |
| 3,768,327 A * | 10/1973 | Dunn et al. | 74/434 |
| 3,842,646 A | 10/1974 | Kuhn | |
| 4,106,366 A | 8/1978 | Altenbokum et al. | |
| 5,390,414 A * | 2/1995 | Lisowsky | 29/893.34 |
| 5,584,202 A | 12/1996 | Kanamaru et al. | |
| 5,903,815 A * | 5/1999 | Scott | 428/564 |
| 5,957,804 A | 9/1999 | Schulz et al. | |
| 5,996,229 A | 12/1999 | Yang | |
| 6,123,640 A | 9/2000 | Schulz | |
| 6,170,156 B1 | 1/2001 | Lev et al. | |

(Continued)

FOREIGN PATENT DOCUMENTS

WO    WO-02/22288 A2    3/2002

*Primary Examiner* — Sarang Afzali
(74) *Attorney, Agent, or Firm* — Dickinson Wright PLLC

(57) ABSTRACT

A method of assembling a planetary gearset includes die-forming a plurality of circumferentially spaced apart teeth on a sun gear, a planet gear and a ring gear. Each tooth includes a pair of tooth flanks in a final net form for engagement with mating gear teeth. The sun gear teeth have a conical shape to allow a first die to linearly move relative to a second die after the gear teeth are die-formed. The planet gears are mounted on a carrier. The sun gear and the planet gear are oriented such that the conical shapes of the respective gear teeth taper in opposite directions from one another and the planet gear teeth meshingly engage with both the ring gear teeth and the sun gear teeth.

12 Claims, 2 Drawing Sheets

(56) References Cited

U.S. PATENT DOCUMENTS

Figure 1:
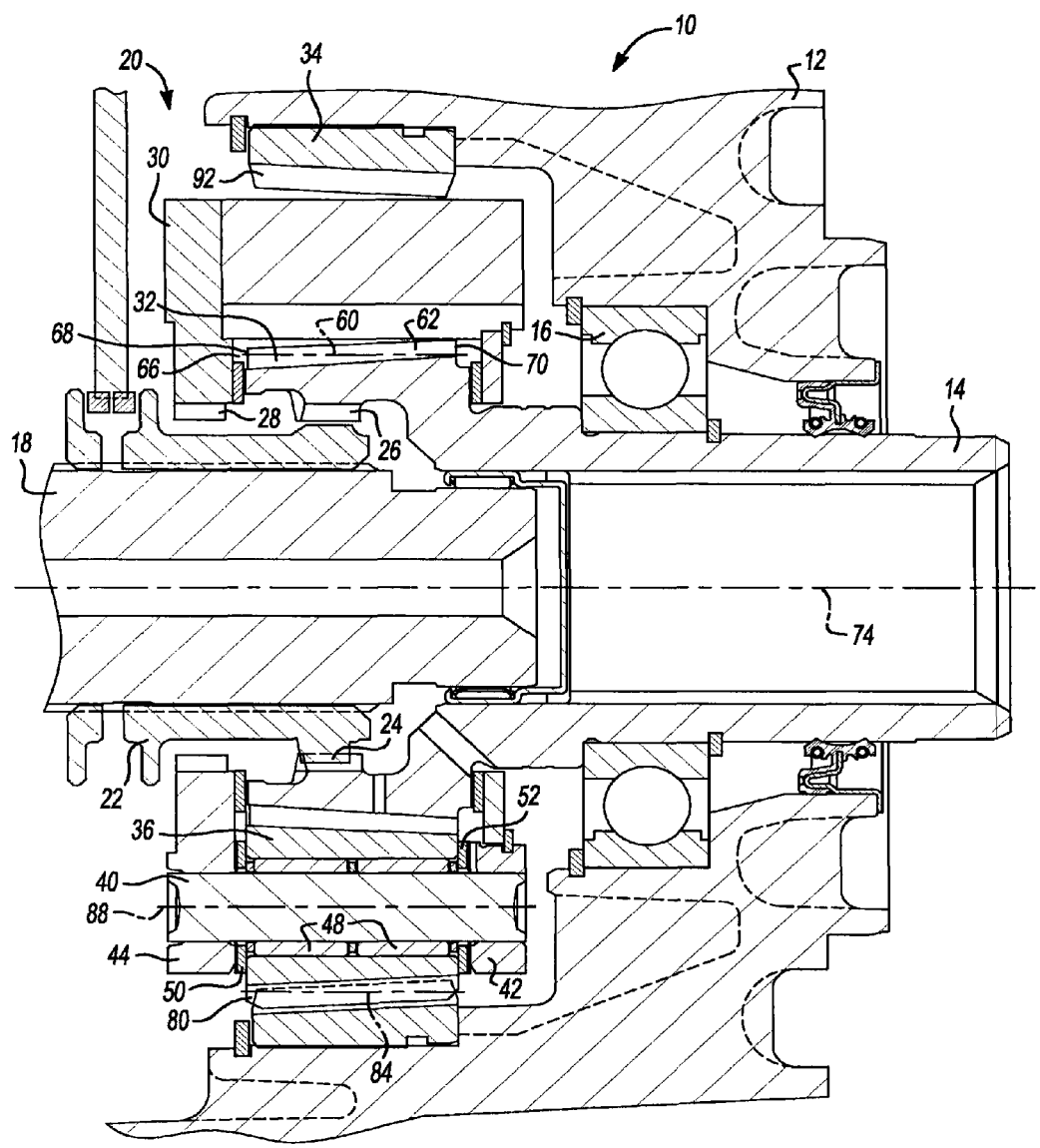

| | | | |
|---|---|---|---|
| 6,220,984 B1 | 4/2001 | Schulz et al. | |
| 6,955,626 B2 * | 10/2005 | Yoshihama et al. | 475/248 |
| 7,568,993 B2 | 8/2009 | Schulz et al. | |
| 7,718,116 B2 | 5/2010 | Geiman | |
| 7,827,692 B2 | 11/2010 | Geiman | |
| 8,424,204 B2 * | 4/2013 | Geiman | 29/893.34 |
| 2010/0322812 A1 | 12/2010 | Geiman | |

* cited by examiner

US 8,613,143 B2

BEVELOID PLANETARY GEAR DRIVE FOR TRANSFER CASE OR TRANSMISSION

CROSS-REFERENCE TO RELATED APPLICATIONS

This application is a 371 U.S. National Stage of International Application No. PCT/US2011/060146, filed Nov. 10, 2011, and claims priority to U.S. Provisional application No. 61/427,824, filed Dec. 29, 2010, the disclosures of which are herein incorporated by reference in their entirety.

FIELD

The present disclosure relates to a planetary gear drive for a power transmission mechanism. More particularly, the gears of the planetary gear drive each include a beveloid shape such that the gears may be manufactured using a die forming process.

BACKGROUND

This section provides background information related to the present disclosure which is not necessarily prior art.

Planetary gearsets have been widely used in various power transmission devices to provide a torque multiplying or gear reduction function. Planetary gearsets typically include a sun gear, a ring gear and one or more planet gears continuously meshed with the sun and ring gears. The shape of each of these gears is typically based on a cylinder having circumferentially spaced apart teeth formed on an external or internal surface of the cylinder. The gear teeth may have a spur or helical shape.

Known processes used to manufacture the gears of a planetary gearset include hobbing, shaping, rolling, shaving, grinding and planing. Some gears, such as a ring gear having spur teeth, may be formed using a broaching process. Each of the previously described known processes require very expensive machines to form an involute shape on the gear tooth flanks. These processes are relatively time consuming and expensive. Accordingly, it may be beneficial to develop a different gear forming process to reduce the time and cost required to form the gear teeth.

SUMMARY

This section provides a general summary of the disclosure, and is not a comprehensive disclosure of its full scope or all of its features.

A method of assembling a planetary gearset includes die-forming a plurality of circumferentially spaced apart teeth on a sun gear, a planet gear and a ring gear. Each tooth includes a pair of tooth flanks in a final net form for engagement with mating gear teeth. The sun gear teeth have a conical shape to allow a first die to linearly move relative to a second die after the gear teeth are die-formed. The planet gears are mounted on a carrier. The sun gear and the planet gear are oriented such that the conical shapes of the respective gear teeth taper in opposite directions from one another and the planet gear teeth meshingly engage with both the ring gear teeth and the sun gear teeth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
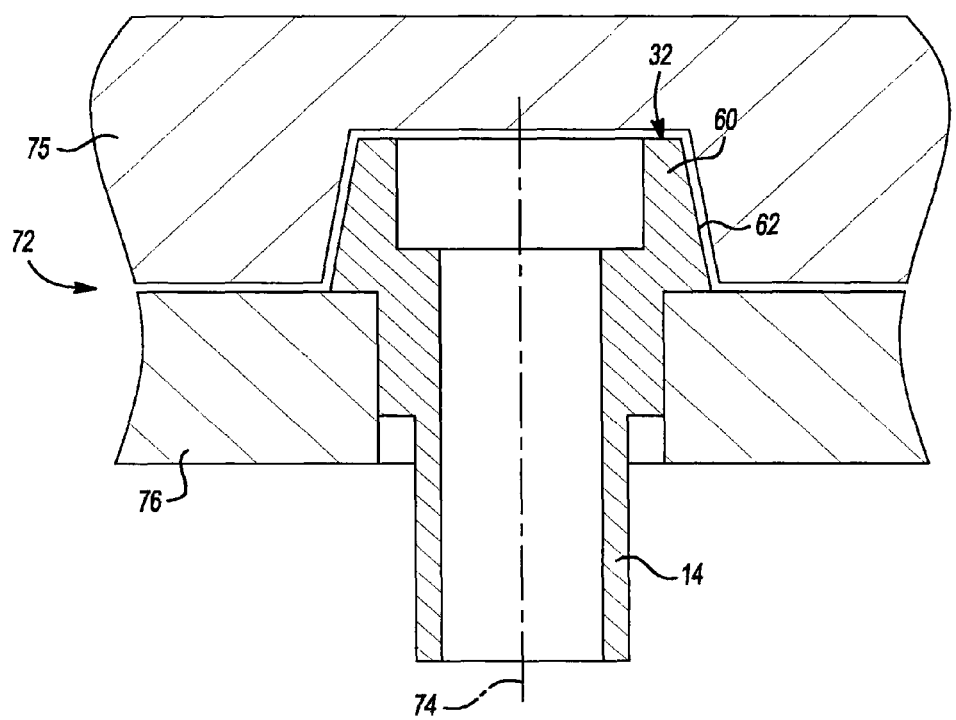

FIG. 1 is a fragmentary cross-sectional side view of a power transmission device equipped with a planetary gearset constructed in accordance with the teachings of the present disclosure; and FIG. 2 is a schematic depicting an exemplary die for forming axially tapered gears.

Corresponding reference numerals indicate corresponding parts throughout the several views of the drawings.

DETAILED DESCRIPTION

Example embodiments will now be described more fully with reference to the accompanying drawings.

FIG. 1 depicts a portion of an exemplary power transmission device 10 such as a transfer case, a transmission or a power take-off unit. Power transmission device 10 includes a housing 12 rotatably supporting an input shaft 14 via a bearing 16. An output shaft 18 is coaxially aligned for rotation with input shaft 14 and is also supported for rotation by housing 12. A planetary gearset 20 is arranged to drivingly interconnect input shaft 14 and output shaft 18.

An axially moveable sleeve 22 is splined to output shaft 18 to be axially moveable between three drive positions. In the position depicted in FIG. 1, sleeve 22 includes an external spline 24 engaged with an internal spline 26 formed on input shaft 14. At this position, input shaft 14 is drivingly coupled to output shaft 18 at a drive ratio of 1:1. Planetary gearset 20 operates in a high range mode.

Sleeve 22 may be axially moved to the left as viewed in FIG. 1 such that external spline 24 is disengaged from internal spline 26 and clear of other planetary gearset components as well. A neutral mode of operation is provided where input shaft 14 is decoupled from output shaft 18. Torque is not transferred between input shaft 14 and output shaft 18 when power transmission device 10 operates in the neutral mode.

In a low range mode of operation, sleeve 22 is further axially displaced to the left to drivingly engage spline 24 with an internal spline 28 formed on a carrier 30 of planetary gearset 20. In the low range mode of operation, output shaft 18 rotates at a reduced speed relative to input shaft 14.

Planetary gearset 20 includes a sun gear 32 integrally formed with input shaft 14. A ring gear 34 is restricted from rotation relative to housing 12. A plurality of planet gears 36 are circumferentially spaced apart from one another and each planet gear 36 is in constant meshed engagement with sun gear 32 and ring gear 34. Each planet gear 36 is rotatably supported on a pin 40 fixed to carrier 30. Carrier 30 includes a front plate 42 and a rear plate 44 fixed to one another. A plurality of bushings or bearings 48 rotatably support each planet gear 36 on one of respective pins 40. Washers 50, 52 axially position planet gears 36 between front plate 42 and rear plate 44.

Sun gear 32 includes a plurality of circumferentially spaced apart teeth 60. Each tooth 60 includes a pair of tooth flanks 62 having an involute shape. Each tooth 60 is conically shaped such that a first end 66 of tooth 60 includes a crest 68 defining a smaller outer diameter than crest 68 defines at an opposite end 70 of tooth 60. The tooth design defines an involute tooth form that is tapered in an axial perspective while maintaining symmetry about a standard cylindrical generating base diameter. By shaping sun gear 32 in this manner, integral input shaft and sun gear 32 may be constructed using a die forming process.

For example, and in reference to FIG. 2, a sintered metal material may be positioned within a die 72 where an axis of rotation 74 of sun gear 32 is vertically oriented. An upper portion 75 and a lower portion 76 of die 72 move relative to one another along the vertical axis. By introducing the conical shape to gear teeth 60, the dies may be separated from one another after the gear teeth 60 have been formed. Furthermore, it is contemplated that the gear forming process of the present disclosure defines tooth flanks 62 to be in their final shape after the die forming process has been competed. Stated another way, each gear tooth 60 is net-formed to include the conical shape and involute shapes of tooth flanks 62 being ready for driving engagement with another gear. No additional material removal or material moving processes are to be applied to tooth flanks 62 after the die forming process.

Subsequent machining processes to other portions of input shaft 14 may be performed but tooth flank surfaces 62 remain untouched after die forming. Depending on the size and geometry of the sun gear being formed, the die forming process may be completed within a single die stroke within a single cavity, or a multiple cavity progressive forming process may be utilized. A progressive densification through multiple die strikes may be used to form a hardened layer at the exterior surfaces of sun gear 32. The mechanical properties of the hardened layer are similar to those defined using a case hardening process.

Each of planet gears 36 includes a plurality of circumferentially spaced apart teeth 80 also defined by a die forming process. Each of teeth 80 includes a pair of tooth flanks 84 having a beveloid or conical shape about an axis of rotation 88 as well as an involute form for the gear meshing surface. Planet gears 36 are constructed using a similar die forming process as described in relation to sun gear 32. The gear tooth beveloid or cone angle for the planet gears is the same as the conical angle used to define sun gear 32. Because planet gears 36 rotate along an axis parallel to and spaced apart from axis of rotation 74, planet gears 36 are positioned such that the conical surfaces of gear teeth 80 complement gear teeth 60 of sun gear 32. Stated another way, the cones of the interconnecting gears open in opposite directions.

Ring gear 34 includes a plurality of spaced apart teeth 92 having a beveloid shape to allow driving meshed interconnection between teeth 80 of planet gears 36 and teeth 92 of ring gear 34. Ring gear 34 is contemplated as being constructed using the die forming process previously described in relation to sun gear 32. As such, each of gear teeth 60, 80 and 92 are net formed including two flanks that do not require further material displacement after the die forming process has been completed.

Use of the parallel axis conical gear design previously described provides an additional advantage of adjusting the back lash of the gearset during the gear assembly process. A back lash adjustment may be accomplished by shimming the axial position of each gear which increases or decreases the clearance between the gear teeth due to the axially tapered tooth form. Washers 50, 52 may be constructed having different thicknesses functioning as shims changing the axial position of planet gears 36 relative to sun gear 32 and ring gear 34.

The foregoing description of the embodiments has bee provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of assembling a planetary gearset, comprising:
    die-forming a plurality of circumferentially spaced apart teeth on a sun gear, each tooth having a pair of tooth flanks in a final net form for engagement with mating gear teeth, the sun gear teeth having a conical shape to allow a first die to linearly move relative to a second die after the sun gear teeth are die-formed;
    die-forming a plurality of circumferentially spaced apart teeth on a planet gear, each planet gear tooth having a pair of tooth flanks shaped in a final net form for engagement with mating sun gear tooth flanks, the planet gear teeth having a conical shape to allow a first die to linearly move relative to a second die after the planet gear teeth are die-formed;
    die-forming a plurality of circumferentially spaced apart teeth on a ring gear, each ring gear tooth having a pair of tooth flanks shaped in a final net form for engagement with mating planet gear tooth flanks, the ring gear teeth having a conical shape to allow a first die to linearly move relative to a second die after the ring gear teeth are die-formed;
    rotatably mounting the planet gear on a carrier;
    orienting the sun gear and the planet gear such that the conical shapes of the respective gear teeth taper in opposite directions from one another; and
    meshingly engaging the planet gear teeth with both the ring gear teeth and the sun gear teeth.

2. The method of claim 1, wherein the ring gear and the planet gear are oriented such that the conical shapes of the respective gear teeth taper in the same direction.

3. The method of claim 2, further including repeatedly closing the die to harden surfaces of the sun gear tooth flanks.

4. The method of claim 1, further including aligning each of the sun gear and the ring gear to rotate about a common axis.

5. The method of claim 4, further including aligning the planet gear to rotate about an axis parallel to the sun gear axis of rotation.

6. The method of claim 1, wherein die-forming the sun gear teeth includes defining an involute-shaped surface on the tooth flanks.

7. The method of claim 6, wherein die-forming the planet gear teeth includes defining an involute-shaped surface on the planet gear tooth flanks, the method further including drivingly engaging the involute-shaped surface of the sun gear with the involute-shaped surface of the planet gear.

8. The method of claim 1, wherein the planet gear teeth are die-formed at an included cone angle ranging from 3 to 20 degrees.

9. The method of claim 1, further including shimming at least one of the gears to change its relative axial position to another one of the gears and change a gear lash based on the conical gear shape.

10. The method of claim 1, wherein the sun gear is formed from a sintered metal material.

11. The method of claim 1, wherein die-forming the sun gear includes constructing the sun gear and an input shaft as a one-piece monolithic member.

12. The method of claim 1, further including fixing a front carrier plate to a rear carrier plate to at least partially define the carrier.

* * * * *